United States Patent [19]

Araki et al.

[11] 4,146,450
[45] Mar. 27, 1979

[54] METHOD FOR REMOVING NITROGEN OXIDES FROM NITROGEN OXIDE-CONTAINING GASES

[75] Inventors: Tadashi Araki; Hatsuo Saito; Masayuki Funabashi; Ritaro Saito, all of Iwaki; Koji Seguchi, Hino, all of Japan

[73] Assignee: Kureha Kagaku Kogyo Kabushiki Kaisha, Tokyo, Japan

[21] Appl. No.: 865,839

[22] Filed: Dec. 30, 1977

[30] Foreign Application Priority Data

Jan. 21, 1977 [JP] Japan ................................ 52-5523

[51] Int. Cl.$^2$ .............................................. B01J 1/10
[52] U.S. Cl. .......................................... 204/157.1 R
[58] Field of Search ................................ 204/157.1 R

[56] References Cited

U.S. PATENT DOCUMENTS 2,753,300  7/1956  Mantell et al. ................. 204/157.1 R
3,869,362  3/1975  Machi et al. ................... 204/157.1 R
4,097,349  6/1978  Zenty ............................ 204/157.1 R

OTHER PUBLICATIONS

Jayanty et al., J. Phys. Chem. 80(5), pp. 433–437 (Feb. 26, 1975).
Kagiya et al., Nippon Kagaku Kaishi (1976) (6): 941–945.

Primary Examiner—Howard S. Williams
Attorney, Agent, or Firm—Stevens, Davis, Miller & Mosher

[57] ABSTRACT

There is disclosed a method for removing nitrogen oxides from a nitrogen oxide-containing gas by contacting the gas with ammonia excited by ultraviolet irradiation in the presence of a catalyst to react the nitrogen oxides with the ammonia. According to the method, the reaction of nitrogen oxides with ammonia proceeds more rapidly than in the case of prior art methods.

2 Claims, No Drawings

METHOD FOR REMOVING NITROGEN OXIDES FROM NITROGEN OXIDE-CONTAINING GASES

FIELD OF THE INVENTION

This invention relates to an improved method for removing nitrogen oxides (hereinafter referred to simply as $NO_x$) from a nitrogen oxide-containing gas by reducing $NO_x$ with ammonia in the presence of a catalyst.

BACKGROUND OF THE INVENTION

A number of methods of removing $NO_x$ from $NO_x$-containing exhaust gases such as combustion exhaust gases have been heretofore known. Of these, a catalytic reduction method using ammonia as a reducing agent is considered to be very useful since the method gives a satisfactory result even on treatment of exhaust gases having relatively high concentrations of $NO_x$ and oxygen. In the method, an $NO_x$-containing exhaust gas is brought into contact with ammonia in the presence of a catalyst at a temperature at which the catalyst can exhibit its optimum activity. By the contact, the $NO_x$ is reacted with ammonia and coverted into harmless substances, i.e., $N_2$ and $H_2O$. The reactions of $NO_x$ with ammonia will be expressed by the following formulae.

$$6NO + 4NH_3 \rightarrow 5N_2 + 6H_2O$$

$$6NO_2 + 8NH_3 \rightarrow 7N_2 + 12H_2O$$

A variety of catalysts are usable in the method and are different in temperatures at which they are optimumly activated. Most of the catalysts are activated in the temperature range of 200° C.–400° C. Some catalysts exhibit extremely high activity at relatively low temperatures of 100° C.–230° C. In an industrial sense, the reaction of $NO_x$ with ammonia should preferably be conducted at a velocity as high as possible and at a temperature as low as possible.

SUMMARY OF THE INVENTION

Therefore, it is an object of the present invention to provide a catalytic reduction method using ammonia as a reducing agent, in which the reaction of $NO_x$ with ammonia is feasible at a velocity higher than those attained by prior art techniques.

The above and other objects of the present invention will become apparent from the following description.

In order to attain the above object, we have made an extensive study of the catalytic reduction method and found that when ammonia which has been previously excited by ultraviolet irradiation is reacted with $NO_x$ in the presence of a catalyst, the reaction proceeds very rapidly. The present invention is based on the above finding.

According to the present invention, there is provided a method for removing $NO_x$ from an $NO_x$-containing gas, which includes contacting the $NO_x$-containing gas with ammonia in the presence of a catalyst to convert $NO_x$ into harmless substances by reaction with ammonia, the ammonia being excited by ultraviolet irradiation.

DETAILED DESCRIPTION OF THE INVENTION

In the practice of the invention, ammonia can be readily excited by ultraviolet irradiation. Preferably, light having a wavelength of approximately 2300 Å is applied to ammonia. The ultraviolet irradiation can be provided by a high pressure mercury lamp. In general, ammonia which is to be fed to a catalyst layer or bed is subjected to the ultraviolet irradiation just ahead of the catalyst layer. In this case, a dense ammonia gas may be introduced into the $NO_x$-containing gas while being irradiated by a high pressure mercury lamp, followed by passing the resulting mixed gas through the catalyst layer. Alternatively, ammonia gas may be first admixed with the $NO_x$-containing gas and then irradiated with use of a high mercury lamp, followed by being passed through a catalyst layer. It will be noted here that the moisture in the exhaust gas gives little or no effect on the irradiation of ammonia gas.

The ammonia treated by the ultraviolet irradiation is partly converted into an $NH_2 \cdot$ radical, which instantaneously reacts with $NO_x$. Though the life time of the radical is very short, ammonia is successively converted into the radical, thus the observed life time of the radical being extended. Further, upon the ultraviolet irradiation, part of ammonia is probably in a merely excited state where it is not yet converted into the radical. It is also considered that ammonia which is in the excited state and is not yet converted into the radical serves to effectively expedite the reaction together with the radical.

The catalysts useful in the method of the invention wherein the excited ammonia is used as a reducing agent are those which can be ordinarily employed together with ammonia used as a reducing agent under ordinary conditions. Any of metal oxide catalysts such as platinum-base catalysts, copper-base catalysts, iron-base catalysts, etc., are useful in considerably accelerating the reaction velocity.

The reaction temperature may be in the range of 200°–500° C. at which the employed catalysts are optimumly activated. However, since the reaction is much facilitated according to the method of the invention, a denitrating rate which is equal to or higher than that attained by a method using non-excited ammonia and reaction temperatures ranging 200°–500° C. is attainable even when a lower temperature is used. For example, when manganese oxide exhibiting its catalytic activity at relatively low temperatures is used as catalyst, a high denitrating rate is attained even at a temperature as low as 180° C. or less.

When an exhaust gas is treated by a known method using non-excited ammonia and such reaction conditions that a denitrating rate of about 95% is attained at a space velocity (hereinafter referred to simply as SV) of 5000 Hr$^{-1}$ and the SV alone is changed to 100,000 Hr$^{-1}$, the denitrating rate is lowered to 80–70% or less. Especially when the reaction temperature used is low, an increased SV gives a great influence on the denitrating rate. On the contrary, in the method of the invention using excited ammonia, the denitrating rate can be held to a level of 90% or more even if the SV is increased to 100,000 Hr$^{-1}$ as will be seen from Examples appearing hereinlater.

According to the method of the invention, particularly when manganese oxide is used as catalyst, the reaction proceeds satisfactorily even at a temperature as low as 100°–180° C. Accordingly, the method of the invention has several advantages that the heat economy is far improved in view of a material saving of heat energy required for heating the $NO_x$-containing gas for denitration and that the cost of catalyst can be lowered by increasing the SV for the catalyst layer.

The $NO_x$-containing gases to be treated by the method of the invention are, for example, exhaust gases such as combustion exhaust gases and are preferred from a viewpoint of durability of catalytic activity to be desulfurized to such an extent as to have sulfur oxides (hereinafter referred to as $SO_x$) content of below 1 ppm, preferably below 0.1 ppm.

The amount of ammonia used for reaction with $NO_x$ is in the $NH_3/NO_x$ ratio (by mol) of 0.7–2.0, preferably about 1.0, similarly to the case where ammonia is not irradiated by an ultraviolet ray. The SV is in the range of 500–100,000 $Hr^{-1}$ or more.

The present invention will be particularly illustrated by way of the following examples.

EXAMPLE 1

A solid catalyst composed of manganese oxide was heated to 150° C. and a combustion exhaust gas containing 180 ppm of $NO_x$, 4% by volume of $O_2$, 16% by volume of $H_2O$ and 0.1 ppm or less of $SO_x$ was subjected to a denitrating treatment using an SV of 10,000 $Hr^{-1}$ and 180 ppm of $NH_3$. The denitrating rate was found to be 72%.

Then, the above process was repeated using an SV of 5,000 $Hr^{-1}$ to give a denitrating rate of 98%.

Further, a high pressure mercury lamp of 100 W was inserted into a line through which $NH_3$ was fed and which was located ahead of the reactor. $NH_3$ gas being fed at room temperature was irradiated by an ultraviolet ray at an SV of 5,000 $Hr^{-1}$ and then immediately mixed with a combustion exhaust gas. During the irradiation, cooling water was passed between the lamp and the gas. The lamp device was constituted of optical quartz glass. The $NH_3$ gas was heated up to about 55° C. by the heat radiated from the lamp and fed into the combustion exhaust gas. Needless to say, the combustion exhaust gas was not directly irradiated by the ultraviolet ray.

The thus mixed combustion exhaust gas having the same gas composition as mentioned hereinabove was subjected to a denitrating treatment at an SV of 10,000 and at a temperature of 150° C. The denitrating rate was increased to 89%. Similarly, when the denitrating treatment was conducted at an SV of 5,000 $Hr^{-1}$ and at a temperature of 130° C., the denitrating rate was found to be 94%. Under these conditions, when the irradiation of the mercury lamp was stopped, the denitrating rate was lowered to 82%.

From the above, it will be understood that the activation by $NH_3$ by the ultraviolet irradiation contributes to acceleration of the reaction.

EXAMPLE 2

The same kind of the catalyst as used in Example 1 was used and a nitrogen gas containing 2,000 ppm of $NO_x$, 2,000 ppm of $NH_3$, 3% by volume of $O_2$ and 10% by volume of $H_2O$ was treated at an SV of 5,000 $Hr^{-1}$ and at a temperature of 150° C. As a result, the denitrating rate was found to be 98%. When the above procedure was repeated using a temperature lowered to 120° C., the denitrating rate was 86%.

When a high pressure mercury lamp of 450 W was disposed upstream used above was passed through the catalyst layer at an SV of 100,000 $Hr^{-1}$, the denitrating rate was increased up to 96% at 120° C. as the result of the ultraviolet irradiation.

What is claimed is:

1. In a method for removing nitrogen oxides from a nitrogen oxide-containing gas by contacting said nitrogen oxide-containing gas with ammonia in the presence of a catalyst, the improvement comprising:

exciting said ammonia by ultraviolet irradiation.

2. The method according to claim 1, wherein a high pressure mercury lamp is used for the ultraviolet irradiation.

* * * * *